United States Patent
Shriberg et al.

(10) Patent No.: US 9,761,247 B2
(45) Date of Patent: Sep. 12, 2017

(54) PROSODIC AND LEXICAL ADDRESSEE DETECTION

(71) Applicant: MICROSOFT CORPORATION, Redmond, WA (US)

(72) Inventors: Elizabeth Shriberg, Berkeley, CA (US); Andreas Stolcke, Berkeley, CA (US); Dilek Hakkani-Tur, Los Altos, CA (US); Larry Heck, Los Altos, CA (US); Heeyoung Lee, Stanford, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 76 days.

(21) Appl. No.: 13/755,738

(22) Filed: Jan. 31, 2013

(65) Prior Publication Data
US 2014/0214421 A1    Jul. 31, 2014

(51) Int. Cl.
| | | |
|---|---|---|
| G10L 25/51 | (2013.01) | |
| G10L 25/03 | (2013.01) | |
| G10L 15/22 | (2006.01) | |
| G10L 15/183 | (2013.01) | |

(52) U.S. Cl.
CPC .............. *G10L 25/51* (2013.01); *G10L 25/03* (2013.01); *G10L 15/183* (2013.01); *G10L 15/22* (2013.01)

(58) Field of Classification Search
CPC .................................................. G10L 15/063
USPC ....................................................... 704/243
See application file for complete search history.

(56) References Cited

U.S. PATENT DOCUMENTS

| | | | |
|---|---|---|---|
| 7,912,720 B1* | 3/2011 | Hakkani-Tur | G06F 17/274 704/1 |
| 7,979,270 B2 | 7/2011 | Yamada | |
| 8,175,879 B2 | 5/2012 | Nitisaroj et al. | |
| 8,249,225 B2 | 8/2012 | Jaiswal et al. | |
| 2003/0078780 A1 | 4/2003 | Kochanski et al. | |
| 2003/0130849 A1* | 7/2003 | Durston et al. | 704/270 |

(Continued)

OTHER PUBLICATIONS

Tamburini, Fabio, "Prosodic Prominence Detection in Speech", In Proceedings of Seventh International Symposium on Signal Processing and its Applications, vol. 1, Jul. 1, 2003, 4 pages.

(Continued)

*Primary Examiner* — Qian Yang

(57) ABSTRACT

Prosodic features are used for discriminating computer-directed speech from human-directed speech. Statistics and models describing energy/intensity patterns over time, speech/pause distributions, pitch patterns, vocal effort features, and speech segment duration patterns may be used for prosodic modeling. The prosodic features for at least a portion of an utterance are monitored over a period of time to determine a shape associated with the utterance. A score may be determined to assist in classifying the current utterance as human directed or computer directed without relying on knowledge of preceding utterances or utterances following the current utterance. Outside data may be used for training lexical addressee detection systems for the H-H-C scenario. H-C training data can be obtained from a single-user H-C collection and that H-H speech can be modeled using general conversational speech. H-C and H-H language models may also be adapted using interpolation with small amounts of matched H-H-C data.

20 Claims, 13 Drawing Sheets

(56) References Cited

U.S. PATENT DOCUMENTS

| | | | | |
|---|---|---|---|---|
| 2005/0119889 | A1* | 6/2005 | Yamazaki | 704/259 |
| 2005/0182619 | A1* | 8/2005 | Azara | G06F 17/279 704/9 |
| 2009/0055175 | A1* | 2/2009 | Terrell et al. | 704/235 |
| 2012/0089396 | A1* | 4/2012 | Patel et al. | 704/249 |
| 2012/0203539 | A1* | 8/2012 | Axelrod | G06F 17/2809 704/2 |
| 2012/0245944 | A1* | 9/2012 | Gruber et al. | 704/270.1 |
| 2012/0265024 | A1 | 10/2012 | Shrivastav et al. | |
| 2013/0144616 | A1* | 6/2013 | Bangalore | 704/226 |
| 2013/0185072 | A1* | 7/2013 | Huang | G10L 15/30 704/246 |

OTHER PUBLICATIONS

Eide, et al., "A Corpus-Based Approach to <Ahem/> Expressive Speech Synthesis", In Proceedings of Fifth ISCA ITRW on Speech Synthesis, Jun. 14, 2004, 6 pages.

Graciarena, et al., "Combining Prosodic Lexical and Cepstral Systems for Deceptive Speech Detection", In Proceedings of IEEE International Conference on Acoustics, Speech and Signal Processing, vol. 1, May 14, 2006, 4 pages.

Keysar, et al., "Speakers' Overestimation of their Effectiveness", In Proceedings of Association for Psychological Science, vol. 13, May 2002, 6 pages.

Akker, et al., "A Comparison of Addressee Detection Methods for Multiparty Conversations", In 13th Workshop on the Semantics and Pragmatics of Dialogue, DiaHolmia, Jun. 24, 2009, 8 pages.

Bohus, et al., "Multiparty Turn Taking in Situated Dialog: Study, Lessons, and Directions", In Proceedings the 12th Annual Meeting of the Special Interest Group on Discourse and Dialogue, Jun. 17, 2011, 12 pages.

Paek, et al., "Continuous Listening for Unconstrained Spoken Dialog" In Proceedings of the Sixth International Conference on Spoken Language Processing, Oct. 16, 2000, 4 pages.

Dowding, et al., "Are You Talking to Me? Dialogue Systems Supporting Mixed Teams of Humans and Robots", In Seventeenth National Conference on Artificial Intelligence, Jul. 30, 2000, 6 pages.

Katzenmaier, et al., "Identifying the Addressee in Human-Human-Robot Interactions based on Head Pose and Speech" In Proceedings of 6th International Conference on Multimodal Interfaces, Oct. 13, 2004, 8 pages.

Reich, et al., "A Real-Time Speech Command Detector for a Smart Control Room" In Proceedings of the 12th Annual Conference of the International Speech Communication Association, Aug. 28, 2011, 4 pages.

Yamagata, et al., "System Request Detection in Human Conversation Based on Multi-Resolution Gabor Wavelet Features" In Proceedings of 10th Annual Conference of the International Speech Communication Association, Sep. 6, 2009, 4 pages.

Hakkani-Tür, et al., "Research Challenges and Opportunities in Mobile Applications", In IEEE Signal Processing Magazine, vol. 28, Issue 4, Jul. 2011, 3 pages.

Hakkani-Tur, et al., "Bootstrapping Domain Detection Using Query Click Logs for New Domains", In Proceedings of in Proceeding of the 12th Annual Conference of the International Speech Communication Association, Aug. 28, 2011, 4 pages.

Yoder, Nate, "PeakFinder", Published on: Oct. 6, 2009, Available at: http://www.mathworks.in/matlabcentral/fileexchange/25500-peakfinder.

Boersma, et al., "Praat: Doing Phonetics by Computer", Retrieved on: Nov. 20, 2012, Available at: http://www.fon.hum.uva.nl/praat/.

Lin, et al., "Language Identification Using Pitch Contour Information", In IEEE International Conference on Acoustics, Speech, and Signal Processing, Mar. 18, 2005, 4 pages.

Dehak, et al., "Modeling Prosodic Features with Joint Factor Analysis for Speaker Verification", In Proceedings of in IEEE Transactions on Audio, Speech, and Language Processing, vol. 15, Issue 7, Sep. 2007, 9 pages.

Burget, et al., "Analysis of Feature Extraction and Channel Compensation in GMM Speaker Recognition System", In IEEE Transactions on Audio, Speech, and Language Processing, vol. 15, Issue 7, Sep. 2007, 7 pages.

Schapire, et al., "Boostexter: A Boosting-based System for Text Categorization", In Journal of Machine Learning, vol. 39, Issue 2-3, Jun. 3, 2000, 34 pages.

Favre, et al., "icsiboost-Open-source Implementation of Boostexter", Retrieved on: Nov. 20, 2012, Available at: http://code.google.com/p/icsiboost/.

Lee, et al.; "Using Out-of-Domain Data for Lexical Addressee Detection in Human-Human-Computer Dialog"; Dept. of Electrical Engineering, Stanford University, CA USA and Microsoft Corporation, CA USA; 2012.

Huang, et al.; "Exploring web scale language models for search query processing," in Proceedings 19th International Conference on World Wide Web, 2010, pp. 451-460.

Cieri, et al.; "The Fisher corpus: a resource for the next generations of speech-to-text," in Proceedings 4th International Conference on Language Resources and Evaluation, Lisbon, May 2004, pp. 69-71.

Janin, et al.; , "The ICSI meeting corpus," in Proceedings ICASSP, 2003, vol. 1, pp. 364-367.

Shriberg, et al.; "Learning when to listen: Detecting systemaddressed speech in human-human-computer dialog," in Proceedings of Interspeech, 2012, 2012.

Witten, et al.; "The zero-frequency problem: Estimating the probabilities of novel events in adaptive text compression," IEEE Transactions on Information Theory, vol. 37, No. 4, pp. 1085-1094, Jul. 1991.

Bellegarda, J.; "Statistical language model adaptation: review and perspectives," Speech Communication, vol. 42, pp. 93-108, 2004.

\* cited by examiner

310

| Data Set | Train | Dev | Test |
|---|---|---|---|
| Recognized words | 4,649 | 6,360 | 5,541 |
| H (%) | 19.1 | 48.6 | 37 |
| C-noncommand (%) | 38.3 | 27.8 | 32.2 |
| C-command (%) | 39.9 | 18.7 | 27.2 |
| M (%) | 2.7 | 4.9 | 3.6 |

320

| Corpus | Addressee | Size |
|---|---|---|
| Single User CB | H-C | 21.9k words |
| Anchor Text | H-C | 1.3B bigrams |
| Fisher | H-H | 21M words |
| ICSI meetings | H-H | 0.7M wods |

FIG. 3

| | ASR | Transcript |
|---|---|---|
| Baseline (in-domain) | 31.1 | 17.3 |
| Fisher+ICSI, Single CB + Search (out-of-domain) | 27.8 | 14.2 |
| Baseline + Fisher+ICSI, Single CB + Search (both-all) | 26.9 | 14.0 |
| Baseline + ICSI, Single CB + Search (both-small) | 26.6 | 13.0 |

| Training Set | ASR output Dev-computer | Dev-human |
|---|---|---|
| In-domain H-C (ASR) | 257 | 1856 |
| Singer User CB | 104 | 1237 |
| Anchor Text | 356 | 789 |
| Interpolation | 58 | 370 |
| | | |
| In-domain H-H (ASR) | 887 | 1483 |
| Fisher | 995 | 795 |
| ICSI Meeting | 2007 | 1583 |
| Interpolation | 355 | 442 |

| ASR C | Ref C | ASR H | REF H |
| --- | --- | --- | --- |
| go | go | play | I |
| scroll | scroll | go | ohh |
| start | start | is | so |
| show | stop | it | yeah |
| stop | show | what | it's |
| bing | find | this | you |
| search | Bing | show | uh |
| find | search | how | okay |
| play | pause | bing | what |
| pause | play | select | it |
| look | look | okay | and |
| what | uh | does | that's |
| select | what | start | is |
| how | how | so | no |
| the | ohh | i | we |

PROSODIC AND LEXICAL ADDRESSEE DETECTION

BACKGROUND

Dialog systems are continually evolving to handle less constrained spoken input, interpret user intent, and engage in natural dialog to accomplish complex tasks. Addressee detection is used in spoken dialog systems to detect whether or not user speech is directed toward the system. In single-user human-computer (H-C) contexts, the alternate addressee may be the user (self-talk), or others in the environment who are not interacting with the system. When multiple users interact jointly with a system (H-H-C dialog), addressee detection becomes even more of a challenge. Human-human (H-H) conversation about the shared task may contain the same keywords a system would listen for. When system-addressed utterances contain more than only commands or keywords, word sequences can begin to look more like those in H-H speech. Other cues such as gaze may also become less reliable. For example, when the users are looking at a system display while talking with each other.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Prosodic features and lexical features may be used for discriminating computer-directed speech from human-directed speech in human-human-computer (H-H-C) dialog. This approach may be used alone, or in combination with explicit methods for computer addressing such as push-to-start/end, hold-to-talk, keywords/hotwords, gaze, or gesture. The prosodic features capture information about how something is said rather than determining what is said. The prosodic features may be used with or without word recognition, contextual information, and/or speaker information. Modeling energy contours of an utterance with Gaussian Mixture Models (GMMs) and/or other features may be used for prosodic modeling. For example, statistics on intensity peaks over time, speech/pause distributions, and/or GMMs may be used for prosodic modeling. One or more prosodic models may be used to identify when a user changes speaking style as they shift addressees (computer versus human). The prosodic features for at least a portion of an utterance are monitored over a period of time to determine a shape associated with the utterance. For example, prosodic features for an utterance currently being received may be determined. A score may be determined to assist in classifying the current utterance as human directed or computer directed without relying on knowledge of preceding utterances or utterances following the current utterance. Prosodic models may be combined with lexical models to detect speaking style differences. Outside data may be used for training lexical addressee detection systems for the H-H-C scenario. H-C training data can be obtained from a single-user H-C collection and that H-H speech can be modeled using general conversational speech. H-C and H-H language models may also be adapted using interpolation with small amounts of matched H-H-C data.

BRIEF DESCRIPTION OF THE DRAWINGS

FIGS. 3-6 illustrate using out-of-domain data for lexical addressee detection in human-human-computer dialog;

DETAILED DESCRIPTION

Figure 1:
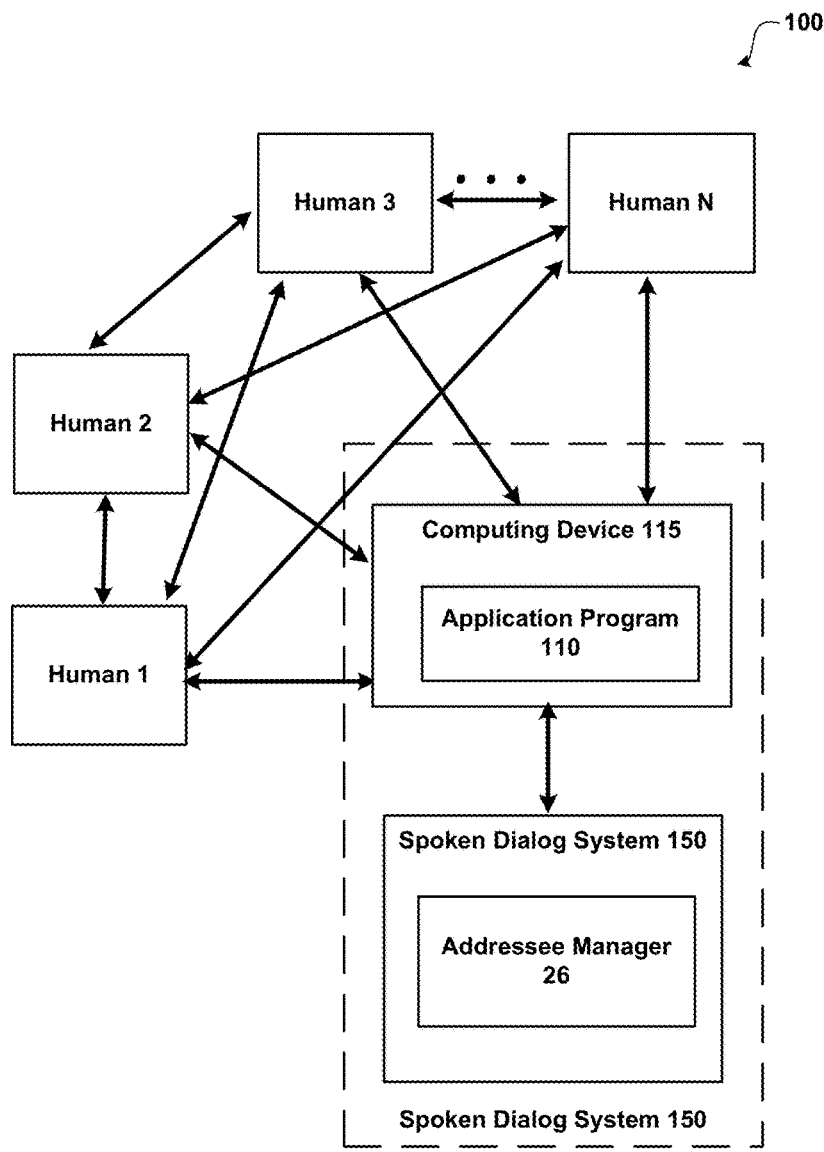
FIG. 1 shows a spoken dialog system for addressee detection.

Referring now to the drawings, in which like numerals represent like elements, various embodiment will be described.

FIG. 1 shows a spoken dialog system using prosodic features for addressee detection. As illustrated, spoken dialog system 100 includes computing device 115, and spoken dialog system 150 comprising an addressee manager 26, with N humans that may interact with each other and/or the spoken dialog system. One or more computing devices/recording devices may be used to receive input (e.g. speech input) from one or more users. Spoken dialog system 150 may be implemented as an online service, an service/application residing on one or more computing devices and/or a combination.

Humans 1-N may interact jointly with the spoken dialog system using unconstrained natural language. Addressee manager 26 is configured to detect computer-directed speech from human-directed speech. Prosodic features are used by addressee manager 26 for the classification of the human directed speech or computer directed speech. Lexical features may also be used for the discrimination. According to an embodiment, the prosodic features exclude word, context, or speaker information.

According to one embodiment, application 110 is a multimodal application that is configured to receive speech input and/or input from a touch-sensitive input device 115 and/or other input devices. For example, speech input, keyboard input (e.g. a physical keyboard and/or SIP), text input, video based input, and the like. Application 110 may also provide multimodal output (e.g. speech, graphics, vibrations, sounds, . . . ). Addressee manager 26 may provide information to/from application 110 in response to user input (e.g. speech/gesture). For example, a user may say a phrase (e.g. an utterance) to identify a task to perform by application 110 (e.g. selecting a movie, buying an item, identifying a product, . . . ). Gestures may include, but are not limited to: a pinch gesture; a stretch gesture; a select gesture (e.g. a tap action on a displayed element); a select and hold gesture (e.g. a tap and hold gesture received on a displayed element); a swiping action and/or dragging action; and the like.

System 100 as illustrated may comprise zero or more touch screen input device/display that detects when a touch input has been received (e.g. a finger touching or nearly teaching the touch screen). Any type of touch screen may be utilized that detects a user's touch input. For example, the touch screen may include one or more layers of capacitive material that detects the touch input. Other sensors may be used in addition to or in place of the capacitive material. For example, Infrared (IR) sensors may be used. According to an embodiment, the touch screen is configured to detect objects that are in contact with or above a touchable surface. Although the term "above" is used in this description, it should be understood that the orientation of the touch panel system is irrelevant. The term "above" is intended to be applicable to all such orientations. The touch screen may be configured to determine locations of where touch input is received (e.g. a starting point, intermediate points and an ending point). Actual contact between the touchable surface and the object may be detected by any suitable means, including, for example, by a vibration sensor or microphone coupled to the touch panel. A non-exhaustive list of examples for sensors to detect contact includes pressure-based mechanisms, micro-machined accelerometers, piezoelectric devices, capacitive sensors, resistive sensors, inductive sensors, laser vibrometers, and LED vibrometers.

Dialog systems, such as spoken dialog system 150, are continually evolving to handle less constrained spoken input, interpret user intent, and engage in natural dialog to accomplish complex tasks. Spoken dialog system 150 is configured to perform addressee detection (AD). As used herein, addressee detection (AD) is directed at detecting whether or not user speech is directed toward the system or toward another human. In single-user human-computer (H-C) contexts, the alternate addressee may be the user him- or herself (self-talk), or others in the environment who are not interacting with the system.

When multiple users interact jointly with a system, referred to herein as Human-Human-Computer (H-H-C) dialog, addressee detection becomes challenging as compared to H-C dialog. Human-human (H-H) conversation about a shared task may contain the same keywords a system would listen for and use. Further, when system-addressed utterances contain more than commands or keywords, word sequences can begin to look more like those in H-H speech. Other cues such as gaze may become less reliable (for example, when users are all looking at a system display, even while talking with each other).

The spoken dialog system 150 performs addressee detection using addressee manager 26 where computer-directed speech may be free-form and linguistically unconstrained. According to an embodiment, spoken dialog system 150 uses energy contour models which, either alone or in combination with more traditional prosodic and ASR-based features, give promising results.

Spoken dialog system 150 may use natural language to interact with the system alone and/or in combination with a set of commands (e.g. start a new interaction, pause, stop listening, or 'wake up' the system). One or more recording devices may be used to detect the speech (e.g. MICROSOFT KINECT, microphone(s), and the like).

According to an embodiment, lexical features (N-grams) are used in discriminating computer-directed speech from human-directed speech human-human-computer (H-H-C) dialog. The N-grams comprise unigrams, bigrams, and trigrams of automatically recognized words, including start/end-of-utterance tags.

A maximum cosine similarity feature may also be used. The maximum cosine similarity feature is directed at capturing whether the user's utterance refers to content displayed by the system. Assume $d_{i,1}, \ldots, d_{i,n}$ are the n items that are shown to the user after turn i, then maximum cosine similarity is defined as $\max_{k=1,\ldots,n} \cos\text{sim}(d_{i,k}, u_{i+1})$ where $u_{i+1}$ is the user's utterance in the next turn, and cos sim(x,y) is the cosine between vectors representing texts x and y, each of which is a binary vector of length |V|, the number of terms in the vocabulary V; each vector component is 0 or 1, depending on the absence or presence of the corresponding word in the utterance. According to another embodiment, the "term frequency" (TF) elements of the vectors x and y can be normalized by the inverse document frequency (IDF) of the terms against a representative corpus of documents. The IDF decreases the importance (weight in the cosine similarity) of common words that are not salient (e.g., "the", "a") and increases the importance of salient terms (e.g., "Seattle mariners", "Rodeo Drive"). The resulting terms that constitute the vectors are called TF-IDF weights.

An ASR confidence score may also be output. According to an embodiment, a real-valued number is used in representing an utterance-level confidence score for the 1-best word sequence output by the recognizer. A low ASR confidence indicates that the speech input does not conform to the recognizer's acoustic and language model, and therefore tends to be indicative of human-directed utterances.

As discussed, spoken dialog system 150 is configured to detect acoustic-prosodic features. According to an embodiment, addressee manager 26 examines the acoustic-prosodic features that are consistent with the following three conditions: 1) Word independent: features that do not rely on ASR; 2) Context-independent: features that do not rely on system state or information from other segments in the session (e.g. no session-level normalization is used); and 3) Speaker-independent: features do not require any speaker normalization or modeling.

According to an embodiment, addressee manager 26 extracts acoustic-prosodic features at a segment-level (e.g. a level of the KINECT segment) that is designed to capture energy and speaking rate features that meet the conditions described above. Pitch features may also be used, e.g. in detecting computer-directed commands.

One set of segment-level prosodic features is extracted from energy peaks, including additional measures. SDS 150 using addressee manager 26 runs a peak-picking algorithm (e.g. the PeakFinder function available as Matlab open source, http://www.mathworks.com/matlabcentral/fileexchange/25500-peakfinder) on 10-ms-frame intensity output (e.g. P. Boersma & D. Weenink, Praat: doing phonetics by computer (Version 5.1.05), http://www.praat.org/, 2009), after mean subtraction. Features may comprise: the peak count, rate, mean and max distance apart, mean/max/min/ stdev intensity value, and the location and value for the highest peak. Another set of features uses speech activity information to describe speaking rate and duration information. According to an embodiment, speech activity features are computed from a time-alignment of the word recognition output within the region that triggered speech activity detection, without making reference to the identity of the recognized words. The features include total waveform duration, lengths of initial and final nonspeech regions, and the total duration of nonspeech regions between words.

In examining computer-directed speech it is found that the computer-directed speech often sounds more rhythmic or "sing-songy" than typical human-human conversation. SDS 150 extracts energy-related features in fixed-length temporal windows and models DCT bases with Gaussian mixture models (GMMs) to attempt to detect this computer-directed speaking style. According to an embodiment, the approach utilizes 10-millisecond-frame c0 output from standard Mel Frequency Cepstral Coefficients (MFCCs), a 200-millisecond sliding window with a 50% shift, and the first 5 Discrete Cosine Transformation (DCT) bases for mean-subtraction-normalized c0 output. According to an embodiment, intensity output may be used instead of c0. Appending the first 2 bases for c1 to those for c0 may also provide benefit. Alternatively, coefficients from a polynomial fit of the energy or intensity contours may be used in addition to or instead of DCT transforms, and modeled with GMMs. Pitch contours, separately or in the same model, may also be used. The energy contour features determined by SDS 150 appear to capture differences in speaking styles (e.g. human-directed and computer-directed) that may occur within the same user, language, acoustic environment, and session.

In addition, prosodic and acoustic features that capture a speaker's vocal effort may be used, because speakers tend to raise their vocal effort when speaking to a computer as opposed to a human. Vocal effort changes modify the absolute energy, the relative energy in different frequency regions, and relative energy magnitudes between voiceless and voiced speech segments. Overall energy measures may be used; these require session- and/or speaker-level normalization because some speakers/sessions are louder than others. Other features that capture vocal effort do not require normalization. Such features include measures of spectral tilt and spectral slope, and delta log energy from unvoiced to voiced speech regions.

A variety of machine learning approaches may be used to model the features described above, and to obtain classifiers for addressee detection. According to an embodiment, the classifiers output a real value that can serve either as a detection score, or as a new feature to be fed into second-level classifiers.

A log likelihood ratio of the two addressee classes is calculated from lexical N-grams by modeling each class with a standard trigram backoff language model (LM). Witten-Bell discounting or any other available method may be used for smoothing LM probability estimates.

Modeling of word classes for less frequent words was found to give improvements over modeling only word N-grams. According to an embodiment, the detection score for an utterance w is computed as $$\frac{1}{|w|} \log \frac{P(w|C)}{P(w|H)}$$

where $|w|$ is the number of recognized words in the test utterance, and P (w|class) is the aggregate likelihood under the class-specific LM.

The energy contour features employ Gaussian mixture models (GMM) to compute a log likelihood ratio. Training feature vectors for each class are pooled and a GMM is trained. The GMM covariances may be full, diagonal, or constrained in some other practical way. The score of a test utterance with feature vectors X then becomes $$\frac{1}{|X|} \log \frac{P(X|C)}{P(X|H)}$$

where $|X|$ is the number of vectors, and P (X|class) is the aggregate GMM likelihood, assuming independence among the vectors. The energy contour features described herein may be modeled by a 20-mixture component GMM, but the number of mixture components may be changed depending on the amount and type of available data. Compensation using eigenchannels, within-class covariances, or some other suitable method may also be applied to the energy contour models.

Real-valued and binary utterance-level features may be modeled by an adaptive boosting algorithm or some other suitable modeling algorithm that allows mixed types of features. Boosting may induce a strong learner as a weighted combination of weak learners, each of which examines only a single feature of the input. The weighted combined score may also serve as a detection score in the experiments. Boosting may be used to jointly model the segment-level acoustic-prosodic features, as well as max cosine similarity and ASR confidence. N-gram features may also be used in boosting. However, language models for those N-gram features, as described above, may provide better results.

According to an embodiment, Linear logistic regression (LLR) is used to calibrate and combine one or more detection scores (obtained by any of the methods described earlier). Given input scores $x_1, \ldots, x_n$, the LLR model produces a new score $x = \text{sigmoid}(a_0 + a_1 x_1 + \ldots + a_n x_n)$, where the function $$sigmoid(x) = \frac{1}{1 + e^{-x}}$$

ranges between 0 and 1 and can be interpreted as a posterior probability of the target class. The parameters $a_0, \ldots, a_n$ are estimated on the training data to minimize the cross-entropy between the model's predictions x and the target labels.

The following results are provided for explanation purposes and are not intended to be limiting.

TABLE 1

System performance.

| | System Type | Model | EER | Error |
|---|---|---|---|---|
| | Chance | Random decision/Majority class | 50.00 | 19.10 |
| 1 | Lexical (ASR) | $LM_{asrng}$ | 28.95 | 17.44 |
| 2 | Lexical (ASR) | LLR ($LM_{asrng}$, $Boost_{cosim, conf}$) | 23.11 | 16.67 |
| 3 | Prosodic (noASR) | $Boost_{segstats}$ | 16.03 | 11.83 |
| 4 | Prosodic (noASR) | $GMM_{energy}$ | 13.93 | 11.21 |
| 5 | Prosodic (noASR) | LLR ($Boost_{segstats}$, $GMM_{energy}$) | 12.63 | 10.17 |
| 6 | Lexical (ASR) + Prosodic (noASR) | LLR ($LM_{asrng}$, $Boost_{cosim, conf}$, $Boost_{segstats}$, $GMM_{energy}$) | 11.08 | 9.06 |
| 7 | Lexical (REF*) | $LM_{refng}$ | 10.16 | 8.88 |
| 8 | Lexical (REF*) + Prosodic (noASR) | LLR ($LM_{refng}$, $Boost_{segstats}$, $GMM_{energy}$) | 6.72 | 5.06 |

EER = equal error rate, Error = classification error.
Subscripts denote features: asrng = asr word ngrams, refng = reference ngrams, cosim = max cosine similarity, conf = asr confidence, energy = c0 DCT bases, segstats = segment-level prosody,
*= human-transcribed words.

Table 1 summarizes the performance of various subsets of features and their combinations. EER is the value at which false detections and misses occur with the same probability relative to their true classes, a metric that is independent of the class priors. Error denotes the overall classification error on the class distribution seen in the data.

In the example illustrated, results with speech recognition at 19% word error rate (WER) show improvements from lexical features (EER=23.1%) to prosodic features (EER=12.6%) to a combined model (EER=11.1%). Prosodic features also provide a 35% error reduction over a lexical model using true words (EER from 10.2% to 6.7%). Modeling energy contours with GMMs provides a particularly good prosodic model. While lexical models perform well for commands, they confuse free-form system-directed speech with human-human speech. Prosodic models dramatically reduce these confusions, implying that users change speaking style as they shift addressees (computer versus human) within a session. Overall results provide strong support for combining simple acoustic-prosodic models with lexical models to detect speaking style differences for this task.

Figure 2:
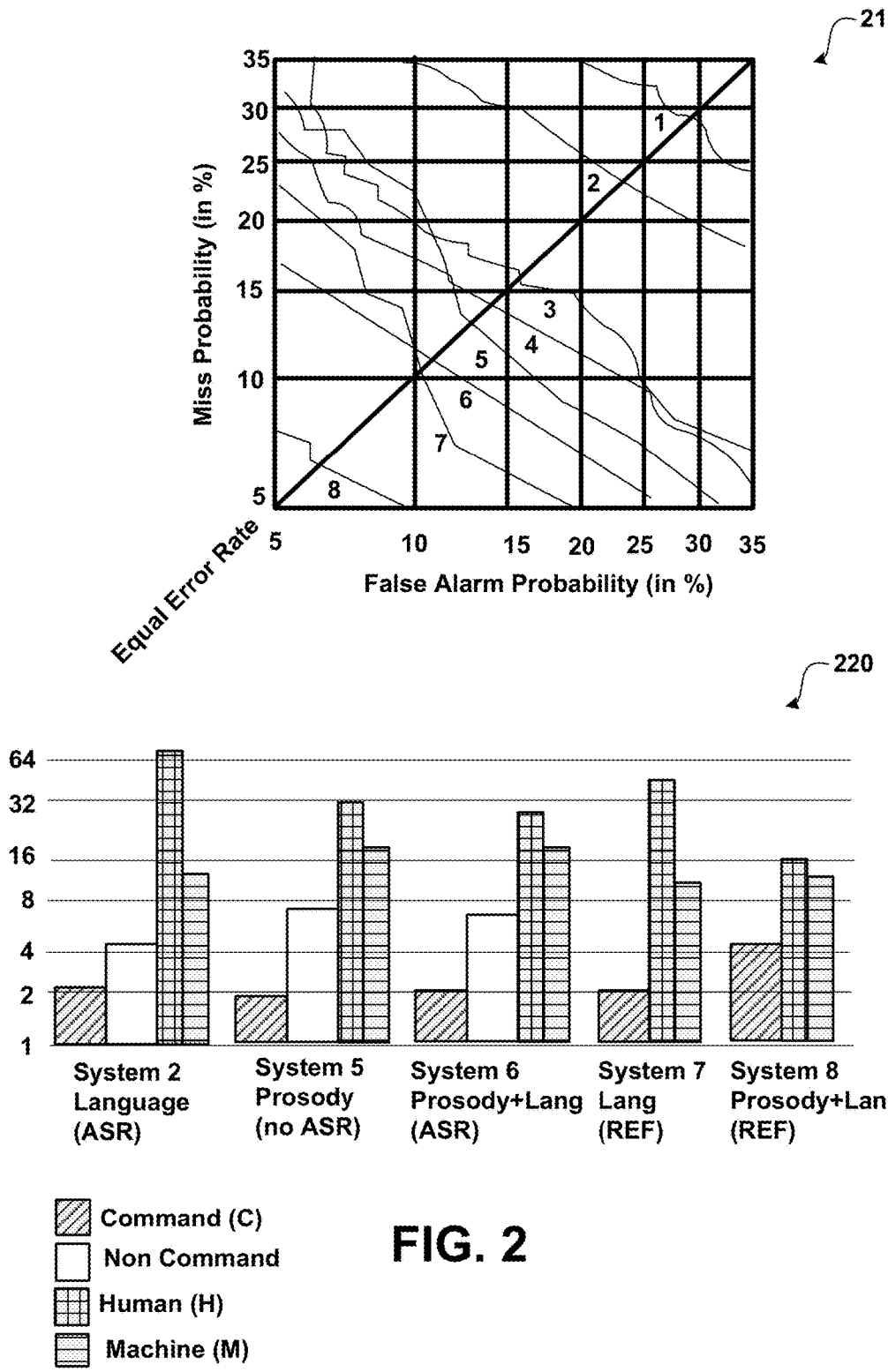
FIG. 2 shows exemplary displays illustrating detection error trade-off (DET) curves and classification error rate by segment type and system.

FIG. 2 shows exemplary displays illustrating DET curves and classification error rate by segment type and system.

As shown in display 210 of FIG. 2, each feature types shows performance gains when combined with others, whether within or across feature types (lexical or prosodic). ASR confidence and max cosine similarity (system 2) add to word N-grams (1). The two individual prosodic models (3,4), despite similar Error (Error! Reference source not found.), combine well to reduce both Error and EER (5). Prosodic models alone (3,4,5) show better results compared to lexical features alone (1,2) and also combine well with lexical features, yielding the best ASR-based performance (6). Prosodic features (5) even provide a 35% relative reduction in EER when added (8) to a system using reference words (7).

Graph 220 of FIG. 2 breaks down performance by segment type. A clear pattern is the high error rates on the human-directed segments (H), especially noting the scale. For example, the H class error rate for System 2 is over 71% error. Prosody (System 5) reduces this rate in absolute terms—from 71% to 33%, without large absolute error increases for commands or noncommands. With correct words alone (System 7), commands are detected as C very well, but the H class still has over 40% error. This is reduced to 15% for System 8, without adding errors on commands, and only slightly increasing error on noncommands in absolute counts. Mixed-type utterances have results intermediate between H and C types; they exhibit the least reduction in classification error, suggesting that they might require different treatment to achieve further improvements.

Acoustic-prosodic features that do not use word recognition are directed at reducing latency in a real-time system and may facilitate portability across domains and even languages. Lexical features alone, even for improved ASR, may have variable quality in the face of noise and various sources of model/data mismatch. Results displayed by FIG. 2 show that even with reference words, lexical features still have trouble classifying human-addressed speech.

FIGS. 3-7 illustrate using out-of-domain data for lexical addressee detection in human-human-computer dialog.

In-domain data is expensive to collect for each new domain that is added to a system. The following description illustrates how human-addressed speech may be modeled using out-of domain conversational speech transcripts, and that human-computer utterances may be modeled using single-user data. Using out-of domain data may result in a system that outperforms a system trained using matched in-domain data without out-of domain data. According to an embodiment, both in-domain and out-of-domain models are interpolated.

Lexical features are highly task- and domain-dependent. Collecting in-domain matched training data used in language models for AD can be time-consuming and expensive. This data collection is made more cumbersome and expensive by the multi-user aspect of the scenario. The method described herein uses out-of domain data for training language models for the H-H-C scenario. A combination of in-domain and out-of-domain data may be used.

In-domain data may be collected from interactions between two users and a spoken dialog system. The in-domain data is split into training, development, and test sets, preserving sessions. According to an embodiment, the segments captured by the speech recognition system are used for AD. As described herein, an utterance segment belongs to one of four types: computer-command (C-command), comprising navigational commands to the system; computer-noncommand (C-noncommand), which are computer-directed utterances other than commands; human-directed (H), and mixed (M) utterances, which contain a combination of human- and computer-directed speech. The sizes and distribution of exemplary utterance subsets are shown in Table 310 shown in FIG. 3. The exemplary data is provided for explanatory purposes and is not intended to be limiting.

To replace the hard-to-obtain in-domain H-H-C data for training, the four out-of-domain corpora (two H-C and two H-H) shown in table 320 are used.

Figure 4:
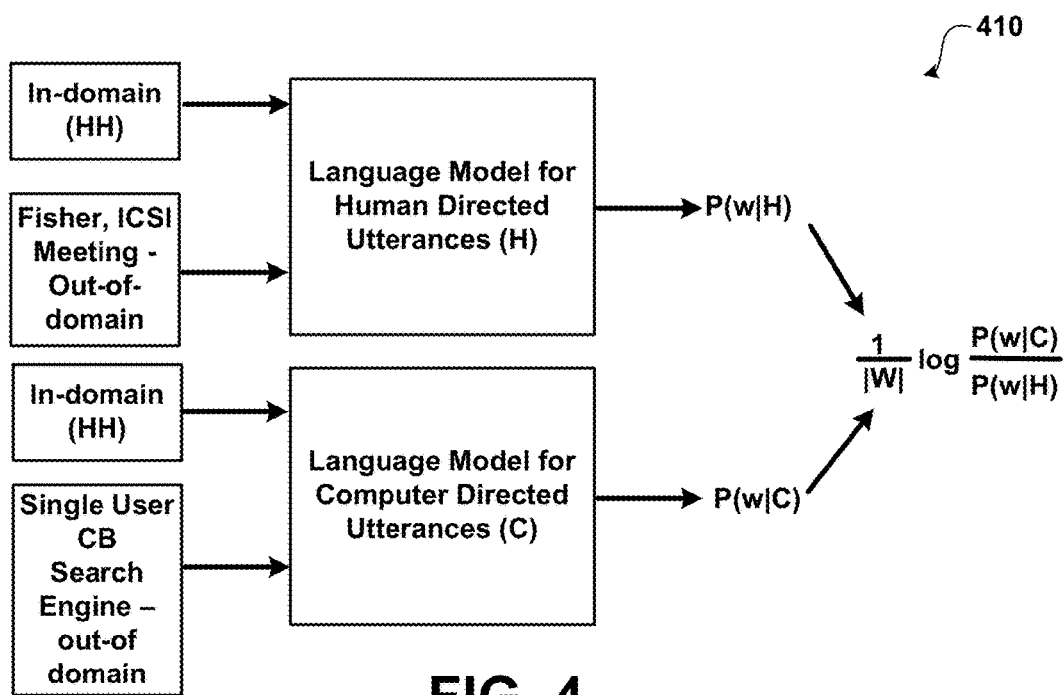

FIG. 4 shows a language model-based score computation for addressee detection based on both in-domain and out-of-domain training data.

Single User CB comes from the same system as the in-domain data, but with a single user present. This data can therefore be used for modeling H-C speech. Search engine anchor text (e.g. BING) comprises a large N-gram corpus of anchor text associated with links on web pages encountered by the search engine. In a speech system, when users want to follow a link displayed on screen they usually speak the anchor text for the link. This corpus may aid the modeling of computer-noncommand type utterances in which such "verbal clicks" are frequent.

Fisher telephone conversations and ICSI meetings are both corpora of human-directed speech. The Fisher corpus comprises two-person telephone conversations between strangers on prescribed topics. The International Computer Science Institute (ICSI) meeting corpus contains multiparty face-to-face technical discussions among colleagues.

For combining various training data sources, language model adaptation by interpolation may be used. Initially, a separate model is trained from each source. The probability estimates from in-domain and out-of-domain models are then averaged in a weighted fashion: $P(w_k h_k) = \lambda P_{in}(w_k h_k) + (1-\lambda) P_{out}(w_k h_k)$ where $w_k$ is the k-th word, $h_k$ is the (N-1)-gram history for the word $w_k$. $\lambda$ is the interpolation weight and is obtained by tuning a task related metric on the development set. $\lambda$ may be optimized for either model perplexity or classification accuracy, as discussed below. Other adaptation methods may be used for combining in-domain and out-of-domain data, such as weighted pooling of N-gram counts from both sources prior to language model estimation.

Typically, an application-dependent threshold is applied to the decision score to convert it into a binary decision. An optimal threshold is a function of prior class probabilities and error costs. For purposes of discussion, equal error rate (EER) is used to compare systems. EER is the probability of false detections and misses at the operating point at which the two types of errors are equally probable. A prior-free metric such as EER may be more meaningful than classification accuracy since the utterance type distribution may heavily skewed (Table 310, FIG. 3), and because the rate of human-versus computer-directed speech can vary widely depending on the particular people, domain, and context. Classification accuracy (based on data priors) may also be used, since EERs are not comparable for different test data subdivisions.

FIG. 5 shows a window model used to conceptualize and simulate addressee detection in an online system.

Utterances may be processed after receiving an entire segment of speech from the recognition subsystem or perform addressee detection in an online manner, making a decision as soon as enough evidence is gathered. As shown in FIG. 5, windows are defined starting at the beginning of the utterance and are used to determine how AD performance changes as a function of window size. According to an embodiment, the words and N-grams falling within a given window are used. For example, the word "find" would be excluded from window 1 in FIG. 5.

Table 520 compares the performance of an exemplary AD system using various training data sources. For diagnostic purposes, performance is compared based on recognized words (the realistic scenario) to that based on human transcripts (idealized, best-case word recognition). As illustrated, example results show that the system trained on out-of-domain data alone performs better by 3.3 EER points on ASR output and 3.1 points on transcripts compared to the in-domain baseline. Combining in-domain and out-of-domain data (both-all, both-small) gives about 1 point additional EER gain. As shown, training on in-domain plus the smaller-size out-of-domain corpora (both-small) is better than using all available data (both-all).

Table 530 shows the detection error trade-off (DET) between false alarm and miss errors for the systems in Table 520. The DET plot depicts performance not only at the EER operating point (which lies on the diagonal), but over the range of possible trade-offs between false alarm and miss error rates. As can be seen, replacing or combining in-domain data with out-of-domain data gives clear performance gains, regardless of operating point (score threshold), and for both reference and recognized words.

Figure 5A:
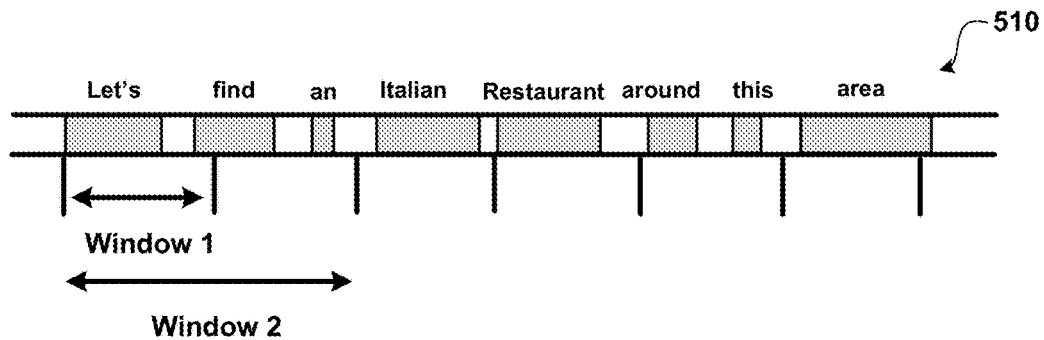
Figure 5A:
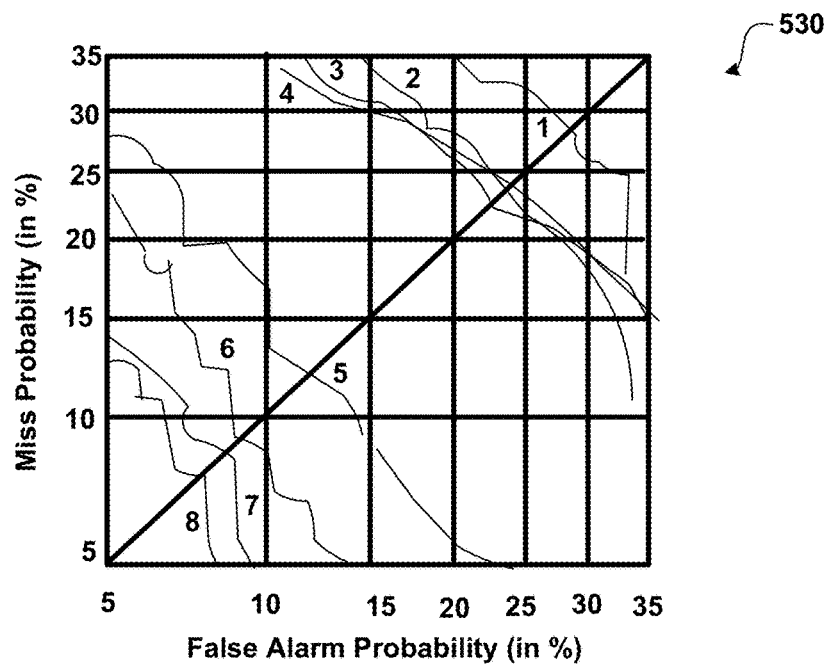
Figure 5B:
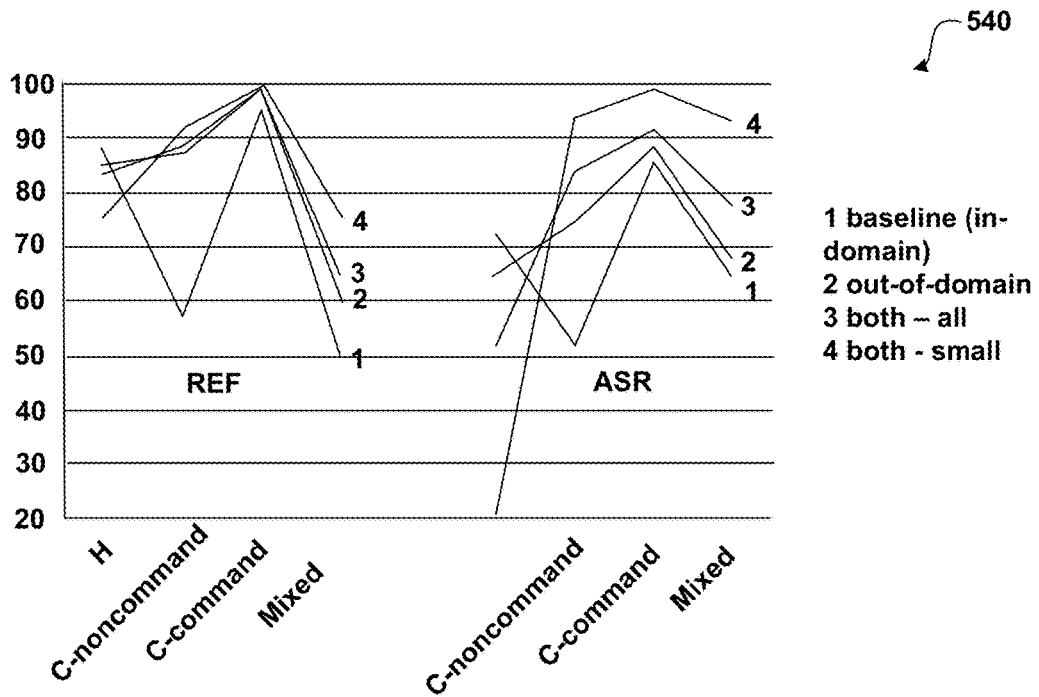

Graph 540 illustrated in FIG. 5B shows the H/C classification accuracies on each of the utterance subtypes listed in Table 510. From graph 540, it can be seen that computer command utterances are the easiest to classify; the accuracy is more than 90% using transcripts, and more than 85% using ASR output. As illustrated, the biggest gain from use of out-of-domain data is found for computer-directed noncommand utterances. This is helpful, since in general it is the noncommand computer-directed utterances (rather than the commands) that are highly confusable with human-directed utterances: both use unconstrained natural language. H utterance may be poorly recognized in the ASR condition when out-of-domain data is used without any in-domain data.

As for the optimization of the mixing weight λ, minimizing perplexity on the development set of each class may be effective. This may be carried out using an expectation maximization algorithm. Other methods may also be used. For example, search-based optimization using the classification metric (EER) as the criterion may be used.

Table 550 in FIG. 5B shows the perplexities by class of language models trained on different corpora. These provide an indication of training/test mismatch (lower perplexity indicating better match).

Interpolating models may reduce perplexity. The models may be trained using the union of the vocabularies from the different sources in order to make the perplexities comparable. In spite of perplexity being a good way to optimize the weighting of sources, it is not clear that it is a good criterion for selecting data sources. For example, referring to table 550, the Fisher model shows that it has a much lower perplexity on H-H utterances than the ICSI meeting model. However, as reflected in Table 530 as shown in FIG. 5A, the H language model that leaves out the Fisher data actually performed better. A possible explanation is that the Fisher corpus is an order of magnitude larger than the ICSI corpus, and that sheer data size, instead of stylistic similarity, may account for the lower perplexity of the Fisher model.

Figure 5C:
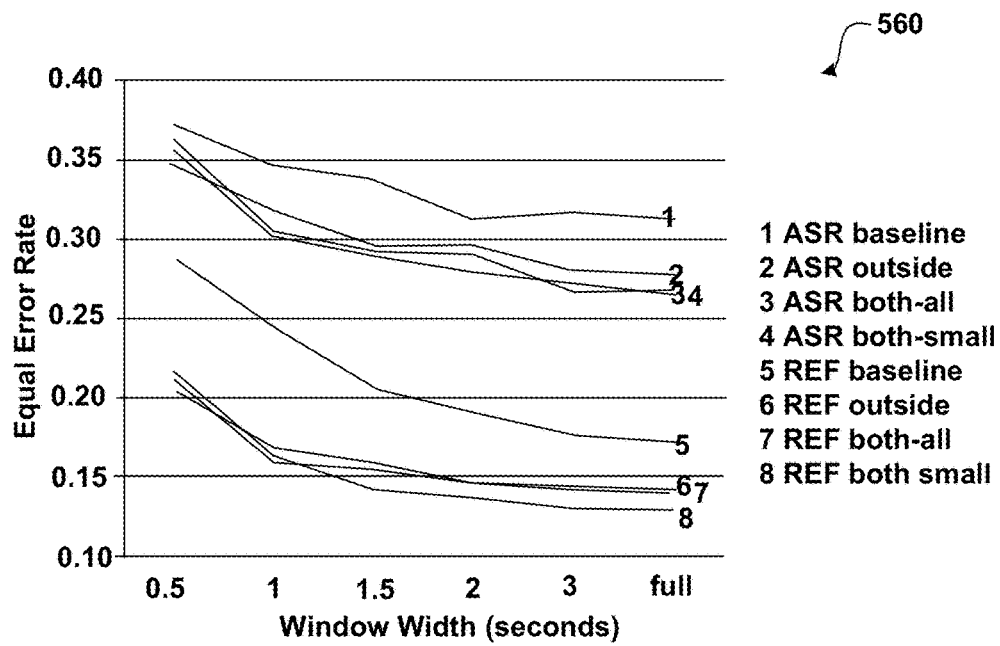

FIG. 5C shows the performance of an exemplary system using windows anchored at the beginnings of utterances. The window width is incrementally increased from 0.5 seconds to 3 seconds and compared to using full utterances. The leveling off of the error plots indicates that most addressee information is contained in the first 1~1.5 seconds, although some additional information is found in the later part of utterances (the plots do not level off completely). This pattern holds for both in-domain and out-of-domain, as well as for combined models. To give an intuitive understanding of where this early addressee relevant information comes from, the top 15 word unigrams are tabulated in each utterance class, are shown in Table 570. In computer directed utterances mostly command verbs are seen, which, due to the imperative syntax of these commands occur in utterance-initial position.

Human-directed utterances are characterized by subject pronouns such as I and it, or answer particles such as yeah and okay, which likewise occur in initial position. The beginnings of utterances thus contain strong lexical cues about the addressee.

As described, outside data may be used for training lexical addressee detection systems for a human-human-computer scenario. This is directed at saving the time and expense of an in-domain data collection, as well as performance gains even when some in-domain data is available. H-C training data may be obtained from a single-user H-C collection, and that H-H speech can be modeled using general conversational speech. Using the outside training data, results are obtained that are even better than results using matched (but smaller) H-H-C training data. Results can be improved considerably by adapting H-C and H-H language models with small amounts of matched H-H-C data, via interpolation. The main reason for the improvement is better detection of computer-directed noncommand utterances, which tend to be confusable with human directed utterances.

Figure 6:
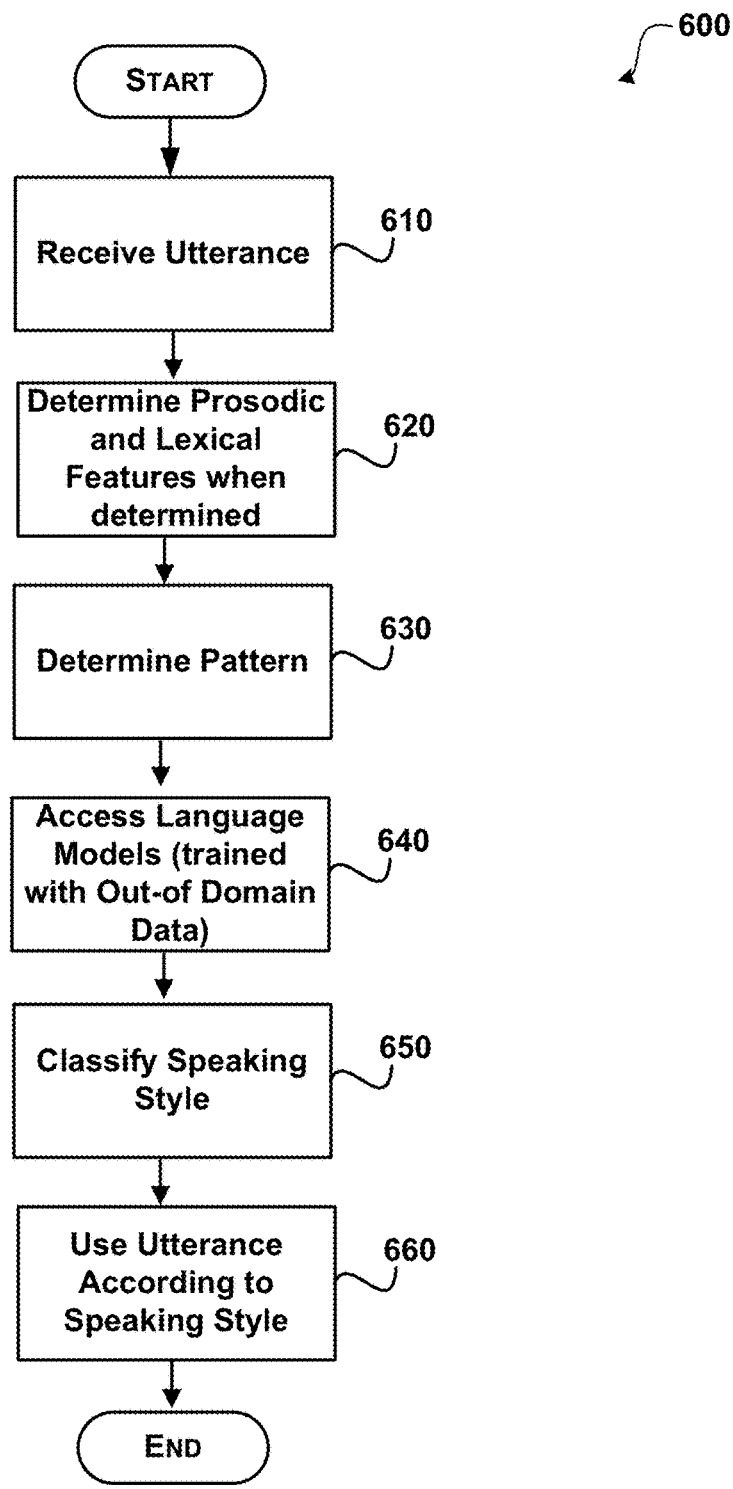

Salient phrases for lexical addressee detection may occur within the first 1 to 1.5 seconds of speech in each utterance. This reflects a syntactic tendency of class specific words to occur utterance-initially, which shows the feasibility of the online AD system FIG. 6 shows an illustrative process for addressee detection. When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

After a start operation, the process moves to operation 610, where an utterance is received. An utterance may be of different lengths. For example, an utterance may comprise approximately one or more seconds of speech input. The utterance may be a complete sentence, a portion of a sentence, a complete/partial command, and the like.

Flowing to operation 620, prosodic features are determined and lexical features may be determined. According to an embodiment, acoustic-prosodic features that are consistent with the following three conditions are determined: 1) Word independent: features that do not rely on ASR; 2) Context-independent: features that do not rely on system state or information from other segments in the session (e.g. no session-level normalization is used); and 3) Speaker-independent: features do not require any speaker normalization or modeling. According to an embodiment, acoustic-prosodic features are extracted from the utterance at a segment-level (e.g. from speech segments detected by the KINECT device) that is designed to capture energy and speaking rate features that meet the conditions described above. While pitch features may be used (e.g. in detecting computer-directed commands) they may be excluded by spoken dialog system. One set of segment-level prosodic features is extracted from energy peaks, including additional measures. Features may comprise: the peak count, rate, mean and max distance apart, mean/max/min/stdev intensity value, and the location and value for the highest peak. Another set of features uses speech activity information to describe speaking rate and duration information. According to an embodiment, speech activity features are computed from a time-alignment of the word recognition output within the region that triggered speech activity detection, without making reference to the identity of the recognized words. The features include total waveform duration, lengths of initial and final nonspeech regions, and the total duration of nonspeech regions between words.

Moving to operation 630, a pattern for the prosodic features are determined. For example, energy contours may be modeled with Gaussian Mixture Models (GMMs) and/or other features may be used for prosodic modeling. For example, statistics on intensity peaks over time, speech/pause distributions, and/or GMMs may be used for prosodic modeling. One or more prosodic models may be used to identify when a user changes speaking style as they shift addressees (computer versus human). The prosodic features for at least a portion of an utterance are monitored over a period of time to determine a shape associated with the utterance.

Moving to operation 640, language models are applied to determine the speaking style based on recognized words, if available. The models may be trained using in-domain data, out-of domain training data and/or some combination of in-domain data and out-of-domain data (e.g. See above). In addition the recognized words may be compared to text display to the user using maxcossim or some other measure.

Transitioning to operation 650, the speaking style is classified as human directed or computer directed, combining available sources of evidence (acoustic-prosodic and/or lexical), using linear logistic regression or some other combination scheme. A score may be calculated (as described above) that is used in determining whether the speech is computer directed or human directed.

Flowing to operation 660, the utterance is used according to the classification of the speaking style. For example, the dialog system may process the speech when it is computer directed and ignore the speech when it is human directed.

The process then moves to an end operation and returns to processing other actions.

Figure 7:
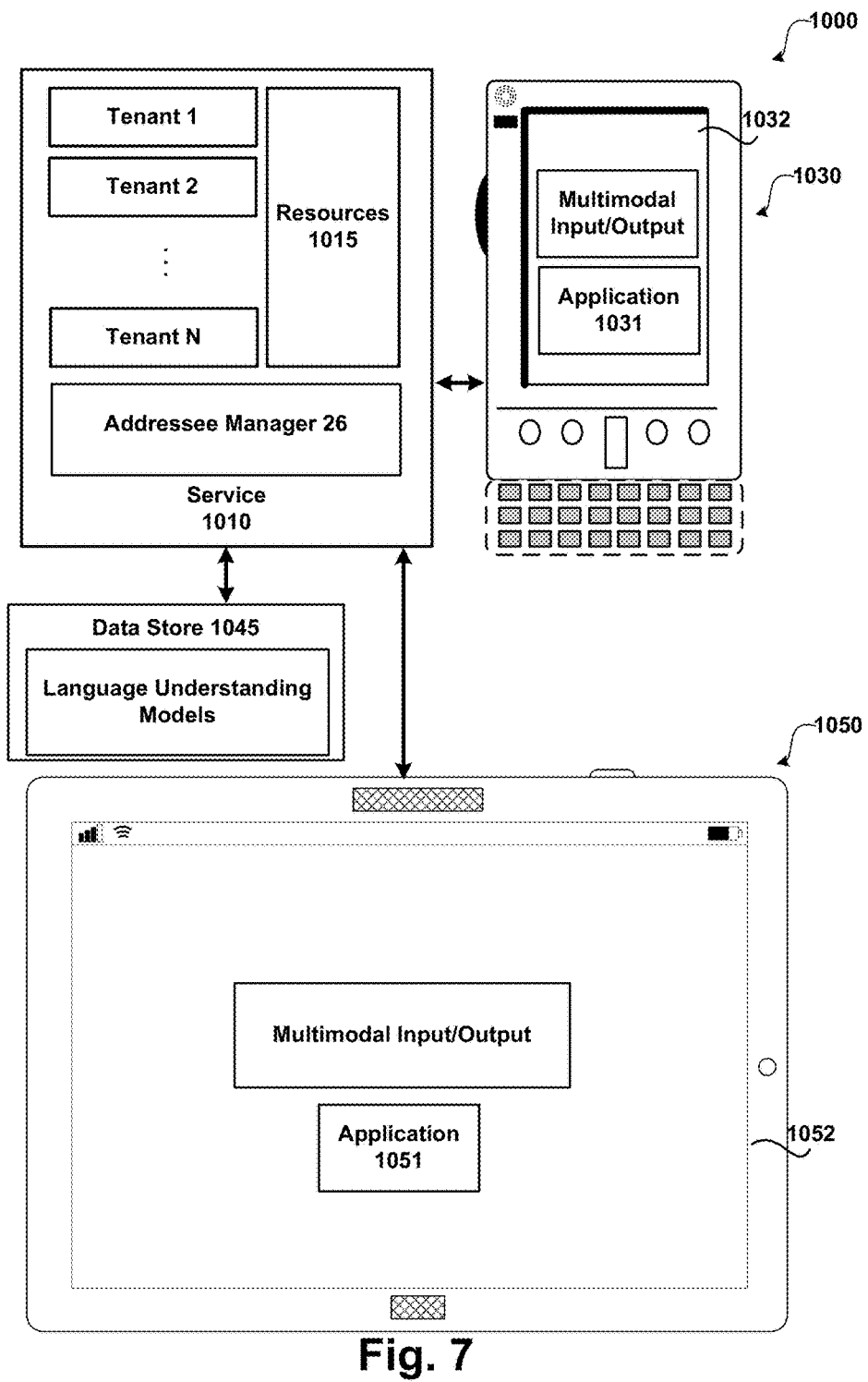
FIG. 7 illustrates an exemplary system that uses prosodic features for addressee detection.

FIG. 7 illustrates an exemplary system that uses prosodic features for addressee detection. As illustrated, system 1000 includes service 1010, data store 1045, touch screen input device/display 1050 (e.g. a slate) and smart phone 1030.

As illustrated, service 1010 is a cloud based and/or enterprise based service that may be configured to provide services that receive utterances to interact with the service, such as multimodal services related to various applications (e.g. games, browsing, locating, productivity services (e.g. spreadsheets, documents, presentations, charts, messages, and the like)). The service may be interacted with using different types of input/output. For example, a user may use speech input, touch input, hardware based input, and the like. The service may provide speech output that combines pre-recorded speech and synthesized speech. Functionality of one or more of the services/applications provided by service 1010 may also be configured as a client/server based application.

As illustrated, service 1010 is a multi-tenant language understanding service that provides resources 1015 and services to any number of tenants (e.g. Tenants 1-N). Multi-tenant service 1010 is a cloud based service that provides resources/services 1015 to tenants subscribed to the service and maintains each tenant's data separately and protected from other tenant data.

System 1000 as illustrated comprises a touch screen input device/display 1050 (e.g. a slate/tablet device) and smart phone 1030 that detects when a touch input has been received (e.g. a finger touching or nearly touching the touch screen). Any type of touch screen may be utilized that detects a user's touch input. For example, the touch screen may include one or more layers of capacitive material that detects the touch input. Other sensors may be used in addition to or in place of the capacitive material. For example, Infrared (IR) sensors may be used. According to an embodiment, the touch screen is configured to detect objects that in contact with or above a touchable surface. Although the term "above" is used in this description, it should be understood that the orientation of the touch panel system is irrelevant. The term "above" is intended to be applicable to all such orientations. The touch screen may be configured to determine locations of where touch input is received (e.g. a starting point, intermediate points and an ending point). Actual contact between the touchable surface and the object may be detected by any suitable means, including, for example, by a vibration sensor or microphone coupled to the touch panel. A non-exhaustive list of examples for sensors to detect contact includes pressure-based mechanisms, micro-machined accelerometers, piezoelectric devices, capacitive sensors, resistive sensors, inductive sensors, laser vibrometers, and LED vibrometers.

According to an embodiment, smart phone 1030 and touch screen input device/display 1050 are configured with multimodal applications (1031, 1051).

As illustrated, touch screen input device/display 1050 and smart phone 1030 shows exemplary displays 1052/1032 showing the use of an application that utilize multimodal input/output (e.g. speech/graphical displays). Data may be stored on a device (e.g. smart phone 1030, slate 1050 and/or at some other location (e.g. network data store 1045). Data store 1054 may be used to store models used by the language understanding system. The applications used by the devices may be client based applications, server based applications, cloud based applications and/or some combination.

Addressee manager 26 is configured to perform operations relating to performing addressee detection using prosodic features and in-domain and/or out-of-domain language models as described herein. While manager 26 is shown within service 1010, the all/part of the functionality of the manager may be included in other locations (e.g. on smart phone 1030 and/or slate device 1050).

The embodiments and functionalities described herein may operate via a multitude of computing systems, including wired and wireless computing systems, mobile computing systems (e.g., mobile telephones, tablet or slate type computers, laptop computers, etc.). In addition, the embodiments and functionalities described herein may operate over distributed systems, where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 8:
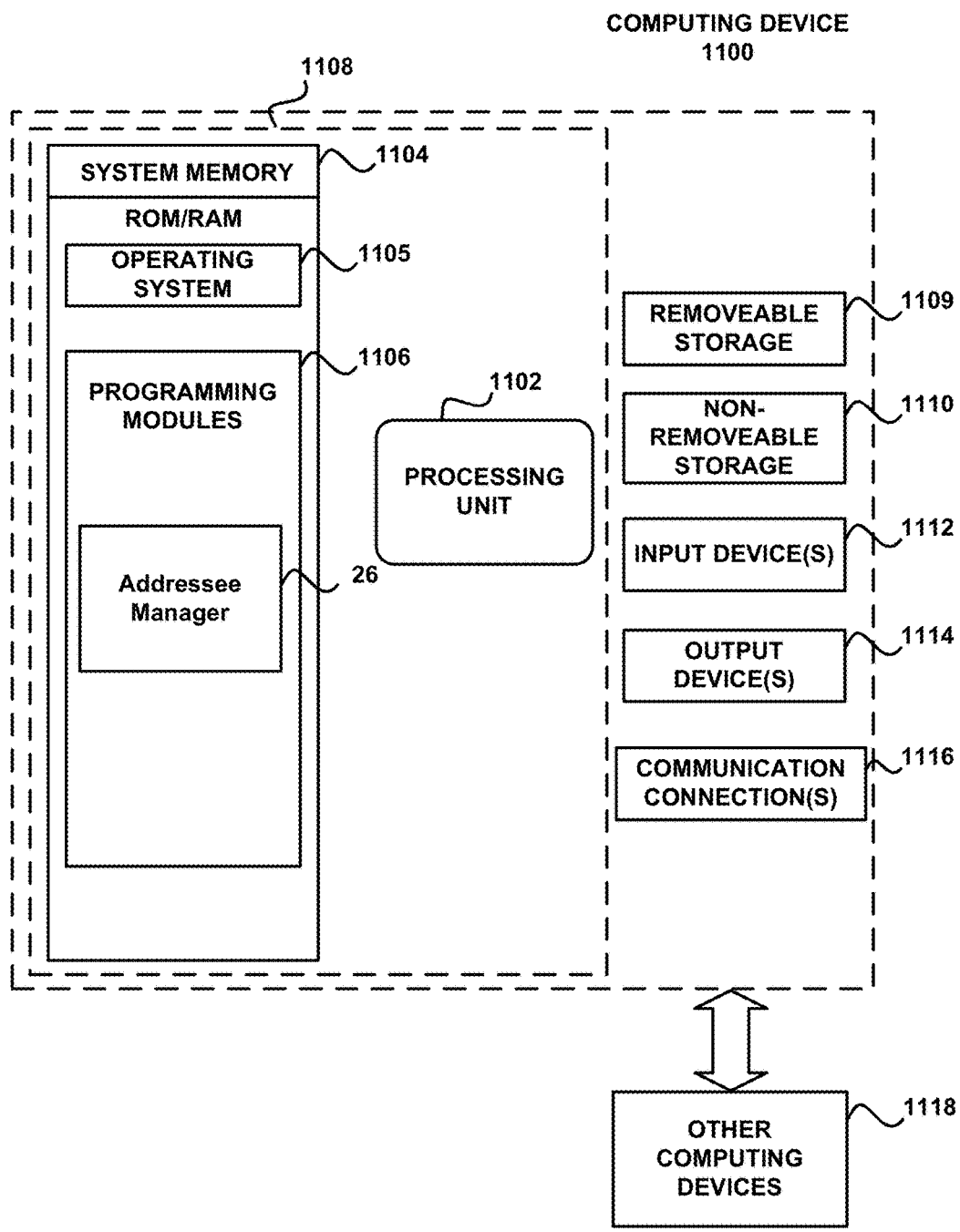
FIGS. 8-10 and the associated descriptions provide a discussion of a variety of operating environments in which embodiments of the invention may be practiced.
Figure 9A:
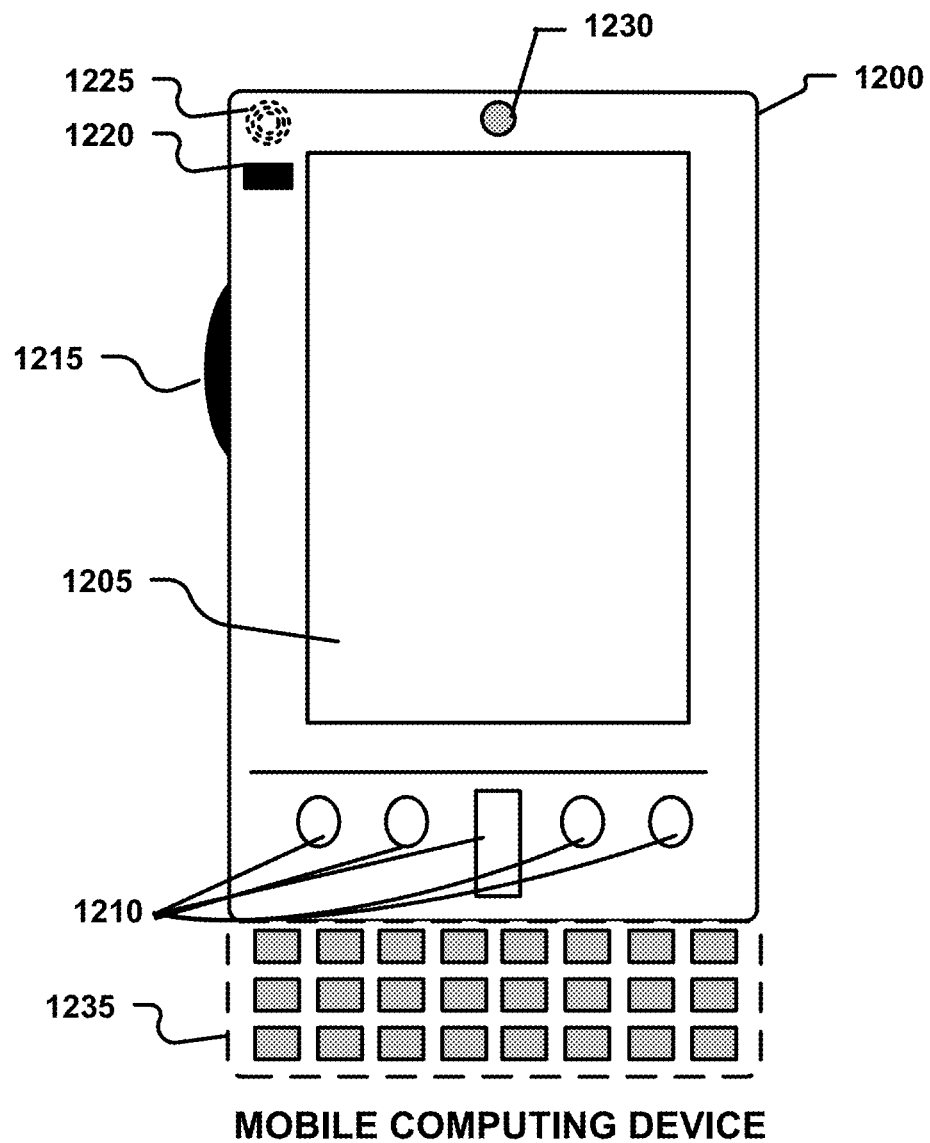
Figure 9B:
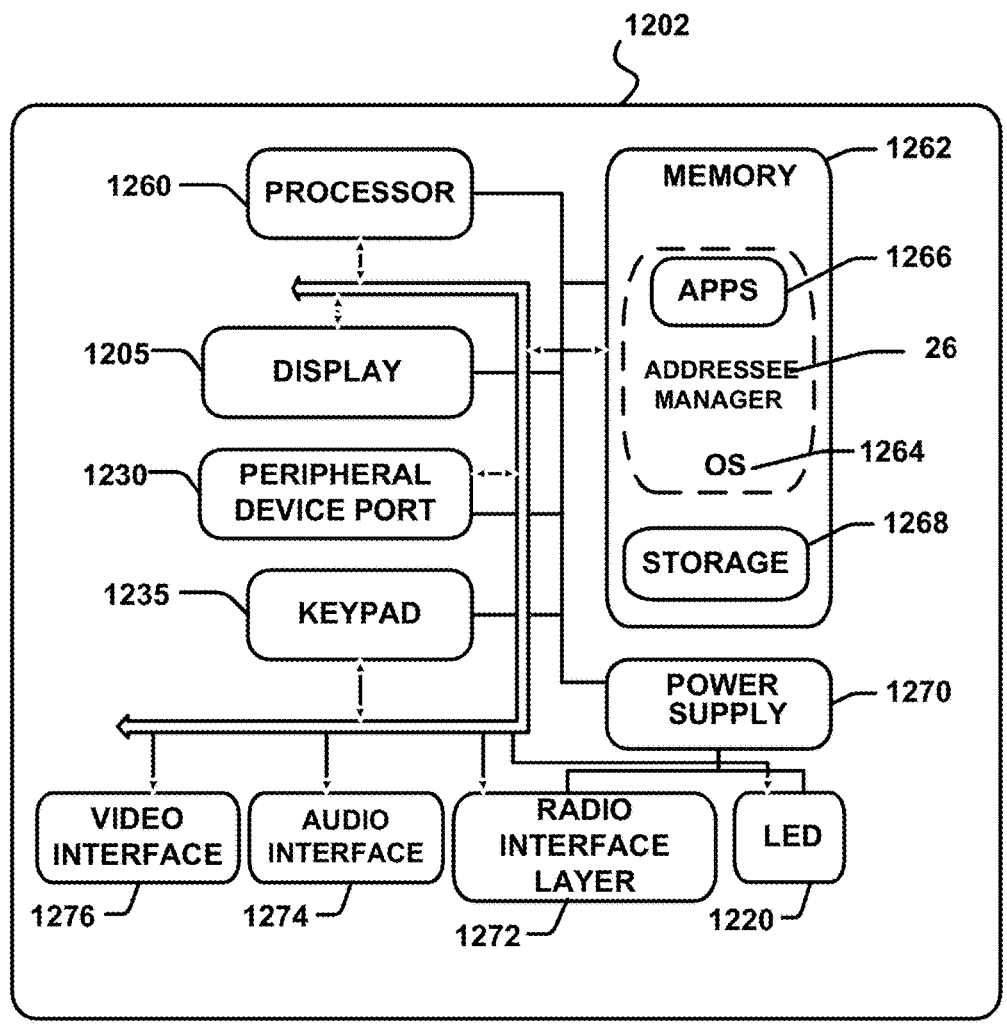
Figure 10:
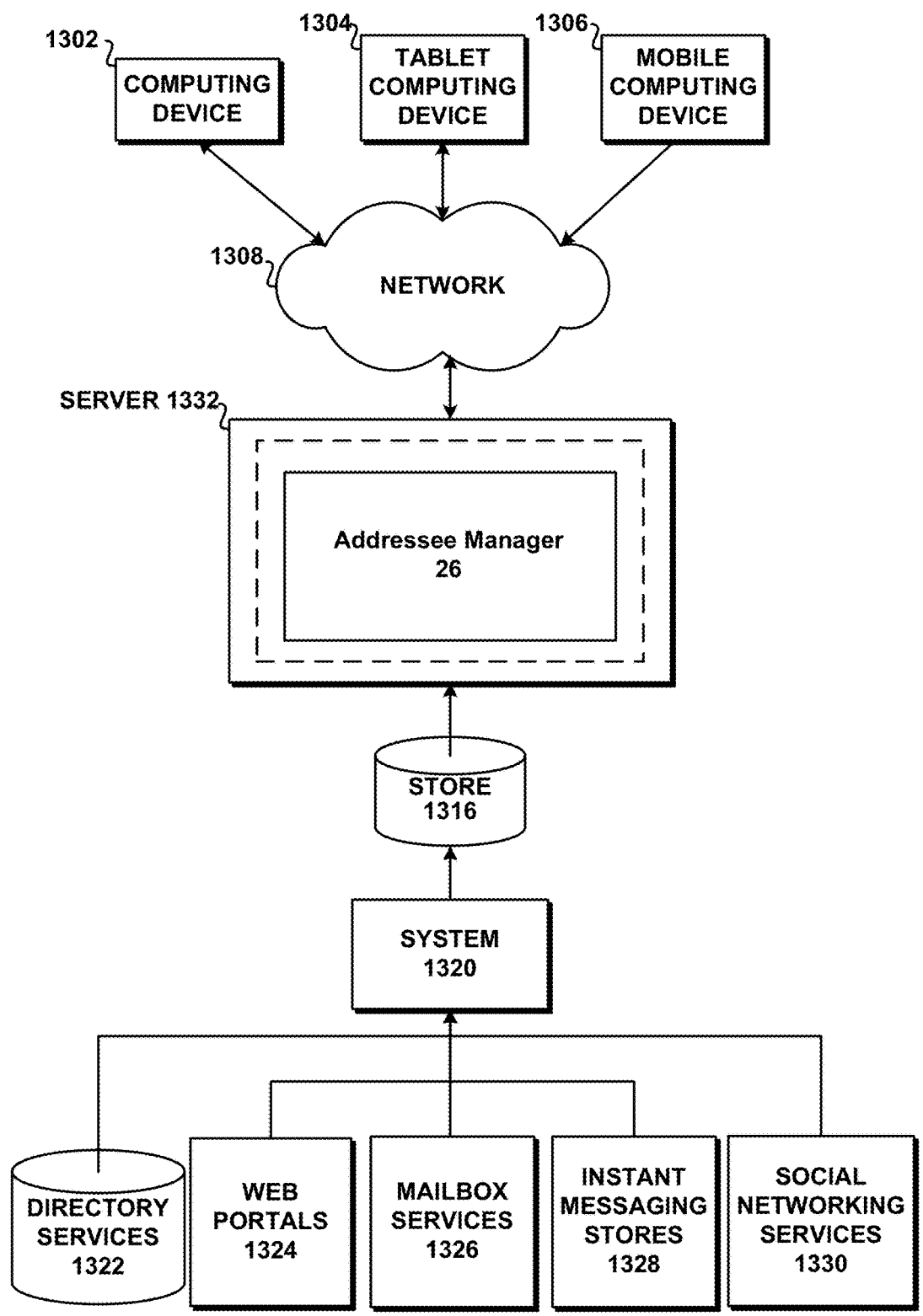

FIGS. 8-10 and the associated descriptions provide a discussion of a variety of operating environments in which embodiments of the invention may be practiced. However, the devices and systems illustrated and discussed with respect to FIGS. 8-10 are for purposes of example and illustration and are not limiting of a vast number of computing device configurations that may be utilized for practicing embodiments of the invention, described herein.

FIG. 8 is a block diagram illustrating example physical components of a computing device 1100 with which embodiments of the invention may be practiced. The computing device components described below may be suitable for the computing devices described above. In a basic configuration, computing device 1100 may include at least one processing unit 1102 and a system memory 1104. Depending on the configuration and type of computing device, system memory 1104 may comprise, but is not limited to, volatile (e.g. random access memory (RAM)), non-volatile (e.g. read-only memory (ROM)), flash memory, or any combination. System memory 1104 may include operating system 1105, one or more programming modules 1106, and may include a web browser application 1120. Operating system 1105, for example, may be suitable for controlling computing device 1100's operation. In one embodiment, programming modules 1106 may include a addressee manager 26, as described above, installed on computing device 1100. Furthermore, embodiments of the invention may be practiced in conjunction with a graphics library, other operating systems, or any other application program and is not limited to any particular application or system. This basic configuration is illustrated in FIG. 8 by those components within a dashed line 1108.

Computing device 1100 may have additional features or functionality. For example, computing device 1100 may also include additional data storage devices (removable and/or non-removable) such as, for example, magnetic disks, optical disks, or tape. Such additional storage is illustrated by a removable storage 1109 and a non-removable storage 1110.

As stated above, a number of program modules and data files may be stored in system memory 1104, including operating system 1105. While executing on processing unit 1102, programming modules 1106, such as the manager may perform processes including, for example, operations related to methods as described above. The aforementioned process is an example, and processing unit 1102 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 8 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the manager 26 may be operated via application-specific logic integrated with other components of the computing device/system 1100 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process.

The term computer readable media as used herein may include computer storage media. Computer storage media may include volatile and nonvolatile, removable and non-removable media implemented in any method or technology for storage of information, such as computer readable instructions, data structures, program modules, or other data. System memory 1104, removable storage 1109, and non-removable storage 1110 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1100. Any such computer storage media may be part of device 1100. Computing device 1100 may also have input device(s) 1112 such as a keyboard, a mouse, a pen, a sound input device, a touch input device, etc. Output device(s) 1114 such as a display, speakers, a printer, etc. may also be included. The aforementioned devices are examples and others may be used.

A camera and/or some other sensing device may be operative to record one or more users and capture motions and/or gestures made by users of a computing device. Sensing device may be further operative to capture spoken words, such as by a microphone and/or capture other inputs from a user such as by a keyboard and/or mouse (not pictured). The sensing device may comprise any motion detection device capable of detecting the movement of a user. For example, a camera may comprise a MICROSOFT KINECT® motion capture device comprising a plurality of cameras and a plurality of microphones.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 9A and 9B illustrate a suitable mobile computing environment, for example, a mobile telephone, a smartphone, a tablet personal computer, a laptop computer, and the like, with which embodiments of the invention may be practiced. With reference to FIG. 9A, an example mobile computing device 1200 for implementing the embodiments is illustrated. In a basic configuration, mobile computing device 1200 is a handheld computer having both input elements and output elements. Input elements may include touch screen display 1205 and input buttons 1210 that allow the user to enter information into mobile computing device 1200. Mobile computing device 1200 may also incorporate an optional side input element 1215 allowing further user input. Optional side input element 1215 may be a rotary switch, a button, or any other type of manual input element. In alternative embodiments, mobile computing device 1200 may incorporate more or less input elements. For example, display 1205 may not be a touch screen in some embodiments. In yet another alternative embodiment, the mobile computing device is a portable phone system, such as a cellular phone having display 1205 and input buttons 1215. Mobile computing device 1200 may also include an optional keypad 1235. Optional keypad 1235 may be a physical keypad or a "soft" keypad generated on the touch screen display.

Mobile computing device 1200 incorporates output elements, such as display 1205, which can display a graphical user interface (GUI). Other output elements include speaker 1225 and LED 1220. Additionally, mobile computing device 1200 may incorporate a vibration module (not shown), which causes mobile computing device 1200 to vibrate to notify the user of an event. In yet another embodiment, mobile computing device 1200 may incorporate a headphone jack (not shown) for providing another means of providing output signals.

Although described herein in combination with mobile computing device 1200, in alternative embodiments the invention is used in combination with any number of computer systems, such as in desktop environments, laptop or notebook computer systems, multiprocessor systems, microprocessor based or programmable consumer electronics, network PCs, mini computers, main frame computers and the like. Embodiments of the invention may also be practiced in distributed computing environments where tasks are performed by remote processing devices that are linked through a communications network in a distributed computing environment; programs may be located in both local and remote memory storage devices. To summarize, any computer system having a plurality of environment sensors, a plurality of output elements to provide notifications to a user and a plurality of notification event types may incorporate embodiments of the present invention.

FIG. 9B is a block diagram illustrating components of a mobile computing device used in one embodiment, such as the computing device shown in FIG. 9A. That is, mobile computing device 1200 can incorporate system 1202 to implement some embodiments. For example, system 1202 can be used in implementing a "smart phone" that can run one or more applications similar to those of a desktop or notebook computer such as, for example, presentation applications, browser, e-mail, scheduling, instant messaging, and media player applications. In some embodiments, system 1202 is integrated as a computing device, such as an integrated personal digital assistant (PDA) and wireless phoneme.

One or more application 1266 may be loaded into memory 1262 and run on or in association with operating system 1264. Examples of application programs include phone dialer programs, e-mail programs, PIM (personal information management) programs, word processing programs, spreadsheet programs, Internet browser programs, messaging programs, and so forth. System 1202 also includes non-volatile storage 1268 within memory 1262. Non-volatile storage 1268 may be used to store persistent information that should not be lost if system 1202 is powered down. Applications 1266 may use and store information in non-volatile storage 1268, such as e-mail or other messages used by an e-mail application, and the like. A synchronization application (not shown) may also reside on system 1202 and is programmed to interact with a corresponding synchronization application resident on a host computer to keep the information stored in non-volatile storage 1268 synchronized with corresponding information stored at the host computer. As should be appreciated, other applications may be loaded into memory 1262 and run on the device 1200, including the addressee manager 26, described above.

System 1202 has a power supply 1270, which may be implemented as one or more batteries. Power supply 1270 might further include an external power source, such as an AC adapter or a powered docking cradle that supplements or recharges the batteries.

System 1202 may also include a radio 1272 that performs the function of transmitting and receiving radio frequency communications. Radio 1272 facilitates wireless connectivity between system 1202 and the "outside world", via a communications carrier or service provider. Transmissions to and from radio 1272 are conducted under control of OS 1264. In other words, communications received by radio 1272 may be disseminated to application 1266 via OS 1264, and vice versa.

Radio 1272 allows system 1202 to communicate with other computing devices, such as over a network. Radio 1272 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

This embodiment of system 1202 is shown with two types of notification output devices; LED 1220 that can be used to provide visual notifications and an audio interface 1274 that can be used with speaker 1225 to provide audio notifications. These devices may be directly coupled to power supply 1270 so that when activated, they remain on for a duration dictated by the notification mechanism even though processor 1260 and other components might shut down for conserving battery power. LED 1220 may be programmed to remain on indefinitely until the user takes action to indicate the powered-on status of the device. Audio interface 1274 is used to provide audible signals to and receive audible signals from the user. For example, in addition to being coupled to speaker 1225, audio interface 1274 may also be coupled to a microphone to receive audible input, such as to facilitate a telephone conversation. In accordance with embodiments of the present invention, the microphone may also serve as an audio sensor to facilitate control of notifications, as will be described below. System 1202 may further include video interface 1276 that enables an operation of on-board camera 1230 to record still images, video stream, and the like.

A mobile computing device implementing system 1202 may have additional features or functionality. For example, the device may also include additional data storage devices (removable and/or non-removable) such as, magnetic disks, optical disks, or tape. Such additional storage is illustrated in FIG. 9B by storage 1268. Computer storage media may include volatile and nonvolatile, removable and non-removable media implemented in any method or technology for storage of information, such as computer readable instructions, data structures, program modules, or other data.

Data/information generated or captured by the device 1200 and stored via the system 1202 may be stored locally on the device 1200, as described above, or the data may be stored on any number of storage media that may be accessed by the device via the radio 1272 or via a wired connection between the device 1200 and a separate computing device associated with the device 1200, for example, a server computer in a distributed computing network such as the Internet. As should be appreciated such data/information may be accessed via the device 1200 via the radio 1272 or via a distributed computing network. Similarly, such data/information may be readily transferred between computing devices for storage and use according to well-known data/information transfer and storage means, including electronic mail and collaborative data/information sharing systems.

FIG. 10 illustrates a system architecture for a system as described herein.

Components managed via the addressee manager 26 may be stored in different communication channels or other storage types. For example, components along with information from which they are developed may be stored using directory services 1322, web portals 1324, mailbox services 1326, instant messaging stores 1328 and social networking sites 1330. The systems/applications 26, 1320 may use any of these types of systems or the like for enabling management and storage of components in a store 1316. A server 1332 may provide communications and services relating to using and determining variations. Server 1332 may provide services and content over the web to clients through a network 1308. Examples of clients that may utilize server 1332 include computing device 1302, which may include any general purpose personal computer, a tablet computing device 1304 and/or mobile computing device 1306 which may include smart phones. Any of these devices may obtain display component management communications and content from the store 1316.

Embodiments of the present invention are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for identifying an intended addressee by a conversational understanding system executing on a computer processing device, the method comprising:
receiving an utterance;
extracting prosodic features from speech segments of the received utterance;
performing an evaluation of the extracted prosodic features to determine whether the intended addressee is one of a human and a computer, wherein the evaluation is word-independent, context-independent, and speaker-independent;
in response to determining that the intended addressee is the computer, processing the utterance to generate a response; and
outputting the response through the computer processing device.

2. The method of claim 1, further comprising:
characterizing the received utterance as a human-computer speaking style or a human-human speaking style based on at least one of a temporal pattern that evaluates segmental duration and a spectral pattern that evaluates at least one of: energy/intensity, pitch, and voice quality/vocal effort features.

3. The method of claim 1, further comprising:
extracting energy-related features from the received utterance using fixed-length temporal windows within the received utterance; and
determining the intended addressee based on the energy-related features.

4. The method of claim 1, further comprising:
determining the intended addressee based on features of the received utterance, wherein the features comprise a peak count, a rate, a mean and a max distance apart, an intensity value, and a location and a value for the highest peak of the received utterance.

5. The method of claim 1, further comprising:
determining the intended addressee based on speech activity information, wherein the speech activity information comprises a speaking rate and a duration.

6. The method of claim 1, further comprising:
determining the intended addressee based on a waveform duration of the received utterance, a length of initial final non-speech regions, and a duration of non-speech regions.

7. The method of claim 1, further comprising: evaluating the intended addressee based on processing lexical features of the speech segments using a lexical model and processing the extracted prosodic features using a prosodic model.

8. The method of claim 7, further comprising training the lexical model used in a Human-Human-Computer dialog with out-of-domain data.

9. The method of claim 8, further comprising: determining the out-of-domain data based on anchor text.

10. The method of claim 7, wherein the lexical model comprises a similarity measure between words of the received utterance and display text.

11. A conversational understanding system comprising:
a processor; and
memory storing computer-executable instructions that, when executed, causes the processor to perform a method comprising:
receive an utterance from a user;
parse the utterance into one or more speech segments;
extract prosodic features from the one or more speech segments;
generate a score for the received utterance based on the prosodic features, wherein generating the score is word-independent, context-independent, and speaker-independent;
determine an intended addressee of the received utterance based on the generated score, wherein the intended addressee is one of a human and a computer;
in response to determining that the intended addressee is the processor, generate a response for the received utterance; and
output the response to the user.

12. The system of claim 11, wherein the method further comprises:
characterizing the received utterance as a human-computer speaking style or a human-human speaking style based on at least one of a temporal pattern that evaluates segmental duration and a spectral pattern that evaluates at least one of: energy/intensity, pitch, and voice quality/vocal effort features.

13. The system of claim 11, wherein the method further comprises:
extracting energy-related features from the received utterance using fixed-length temporal windows within the received utterance; and
determining the intended addressee based on the energy-related features.

14. The system of claim 11, wherein the method further comprises:
determining the intended addressee based on features of the received utterance, wherein the features comprise a peak count, a rate, a mean and a max distance apart, an intensity value, and a location and a value for the highest peak of the received utterance.

15. The system of claim 11, wherein the computer is a computing device that is executing the conversational understanding system.

16. The system of claim 11, wherein the method further comprises:
determining the intended addressee based on speech activity information, wherein the speech activity information comprises a length of initial final non-speech regions and a duration of non-speech regions for the extracted prosodic features.

17. A conversational understanding system for addressee detection, comprising:
a computer processor and memory;
an operating environment executed by the computer processor; and
an addressee manager that is configured to perform actions comprising:
receiving an utterance;
extracting prosodic features from speech segments of the received utterance;
performing an evaluation of the extracted prosodic features to determine whether the intended addressee is a computer or a human, wherein the evaluation is word-independent, context-independent, and speaker independent;
in response to determining that the intended addressee is the computer, processing the utterance to generate a response for the received utterance; and
outputting the response through the conversational understanding system.

18. The system of claim 17, wherein the performed actions further comprise:
extracting energy-related features from the received utterance using fixed-length temporal windows within the received utterance and;
determining the intended addressee based on the extracted energy-related features.

19. The system of claim 17, wherein the performed actions further comprise:
determining the intended addressee based on features of the received utterance, wherein the features comprise of a peak count, a rate, a mean and a max distance apart, an intensity value, and a location and a value for the highest peak of the received utterance.

20. The system of claim 17, wherein the performed actions further comprise:
determining the intended addressee based on speech activity information, wherein the speech activity information comprises a length of initial final non-speech regions and a duration of non-speech regions.

* * * * *